United States Patent
Palakshamurthy et al.

(10) Patent No.: US 9,071,815 B2
(45) Date of Patent: Jun. 30, 2015

(54) METHOD, APPARATUS AND COMPUTER PROGRAM PRODUCT FOR SUBTITLE SYNCHRONIZATION IN MULTIMEDIA CONTENT

(75) Inventors: Chethan Palakshamurthy, Bangalore (IN); Sujay Patil, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 288 days.

(21) Appl. No.: 13/590,478

(22) Filed: Aug. 21, 2012

(65) Prior Publication Data

US 2013/0216202 A1    Aug. 22, 2013

(30) Foreign Application Priority Data

Aug. 31, 2011  (IN) .......................... 3010/CHE/2011

(51) Int. Cl.
*H04N 5/92* (2006.01)
*H04N 9/87* (2006.01)
*H04N 9/82* (2006.01)

(52) U.S. Cl.
CPC ............ *H04N 9/8715* (2013.01); *H04N 9/8205* (2013.01); *H04N 9/8233* (2013.01)

(58) Field of Classification Search
CPC .. H04N 9/8205; H04N 9/8715; H04N 9/8233
USPC ........................................................ 386/241
See application file for complete search history.

(56) References Cited

U.S. PATENT DOCUMENTS

| | | |
|---|---|---|
| 7,191,117 B2 | 3/2007 | Kirby et al. |
| 2006/0251406 A1* | 11/2006 | Tseng et al. ............... 386/112 |
| 2006/0272000 A1 | 11/2006 | Kwak et al. |
| 2008/0267587 A1 | 10/2008 | Kang et al. |
| 2009/0070850 A1* | 3/2009 | Lee ............................... 725/131 |
| 2012/0079380 A1* | 3/2012 | Tsai et al. .................... 715/716 |
| 2012/0275761 A1* | 11/2012 | Li et al. ........................ 386/239 |

FOREIGN PATENT DOCUMENTS

KR    2008-0073494 A    8/2008

OTHER PUBLICATIONS

Chen, "Developing and Evaluating SynctoLearn, a Fully Automatic Video and Transcript Synchronization Tool for EFL Learners", Computer Assisted Language Learning, vol. 24, Issue 2, Retrieved on Aug. 8, 2013, Webpage available at : http://www.ingentaconnect.com/content/routledg/call/2011/00000024/00000002/art00002.
"Subfix", MacUpdate, Retrieved on Jun. 8, 2011, Webpage available at : http://www.macupdate.com/app/mac/28240/subfix/.

(Continued)

*Primary Examiner* — Thai Tran
*Assistant Examiner* — William Tran
(74) *Attorney, Agent, or Firm* — Harrington & Smith

(57) ABSTRACT

In accordance with an example embodiment a method, apparatus and computer program product are provided. The method comprises receiving a request for synchronization of a subtitle text data with multimedia content. The method also comprises accessing summarization data associated with at least a portion of the multimedia content. The summarization data comprises text data generated from at least the portion of the multimedia content. The text data is compared with at least a portion of the subtitle text data for determining presence of the text data in the subtitle text data. The subtitle text data is synchronized with the multimedia content based on the determination of the presence of the text data in at least the portion of the subtitle text data.

16 Claims, 6 Drawing Sheets

(56) References Cited

OTHER PUBLICATIONS

Ortega et al., "Real-time Live Broadcast News Subtitling System for Spanish", In Proceedings of Interspeech, 2009, 4 pages.

Yi et al., "Semantic Video Indexing and Summarization Using Subtitles", Advances in Multimedia Information Processing—PCM, Lecture Notes in Computer Science, vol. 3331, 2004, pp. 634-641.

* cited by examiner

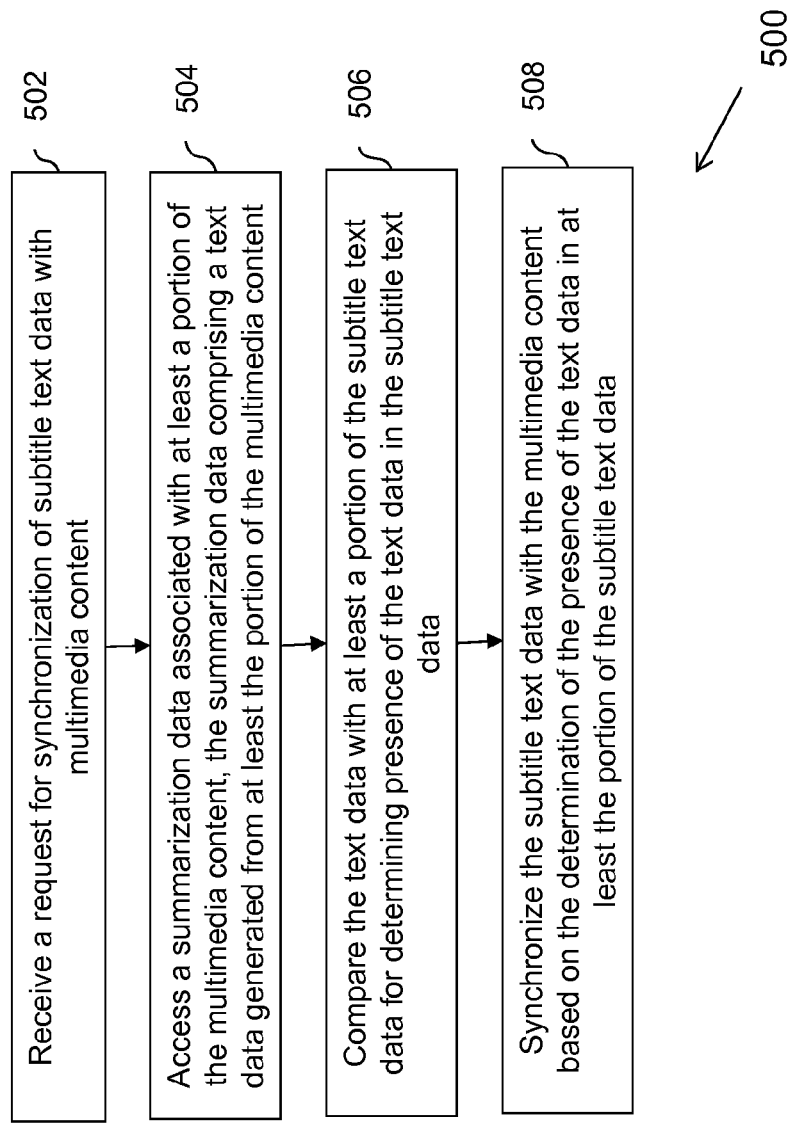

METHOD, APPARATUS AND COMPUTER PROGRAM PRODUCT FOR SUBTITLE SYNCHRONIZATION IN MULTIMEDIA CONTENT

TECHNICAL FIELD

Various implementations relate generally to method, apparatus, and computer program product for subtitle synchronization in multimedia content.

BACKGROUND

A multimedia content, for example a video of a movie may include subtitles for content presentation. Subtitles are textual representations of the dialogs in the videos, such as television programs, movies and the like. Subtitles in different languages enables viewers/audience to view and understand multimedia content in different languages, as majority of multimedia devices have the capability to display subtitles along with audio and/or video content. Data associated with subtitles, hereinafter referred to as subtitle text data is usually available as a separate track and/or stream with the audio and/or video content. The subtitle data may be available in several media file formats, including but limited to, mp4, Divx, and the like, on a multimedia storage medium such as a compact disk (CD), Digital Video Disk (DVD), flash drive, physical memory, memory cards, and the like.

SUMMARY OF SOME EMBODIMENTS

Various aspects of examples of examples embodiments are set out in the claims.

In a first aspect, there is provided a method comprising: receiving a request for synchronization of subtitle text data with multimedia content; accessing summarization data associated with at least a portion of the multimedia content, the summarization data comprising text data generated from at least the portion of the multimedia content; comparing the text data with at least a portion of the subtitle text data for determining presence of the text data in the subtitle text data; and synchronizing the subtitle text data with the multimedia content based on the determination of the presence of the text data in at least the portion of the subtitle text data.

In a second aspect, there is provided an apparatus comprising at least one processor; and at least one memory comprising computer program code, the at least one memory and the computer program code configured to, with the at least one processor, cause the apparatus to perform at least: receiving a request for synchronization of subtitle text data with multimedia content; accessing summarization data associated with at least a portion of the multimedia content, the summarization data comprising text data generated from at least the portion of the multimedia content; comparing the text data with at least a portion of the subtitle text data for determining presence of the text data in the subtitle text data; and synchronizing the subtitle text data with the multimedia content based on the determination of the presence of the text data in at least the portion of the subtitle text data.

In a third aspect, there is provided a computer program product comprising at least one computer-readable storage medium, the computer-readable storage medium comprising a set of instructions, which, when executed by one or more processors, cause an apparatus to perform at least: receiving a request for synchronization of subtitle text data with multimedia content; accessing summarization data associated with at least a portion of the multimedia content, the summarization data comprising text data generated from at least the portion of the multimedia content; comparing the text data with at least a portion of the subtitle text data for determining presence of the text data in the subtitle text data; and synchronizing the subtitle text data with the multimedia content based on the determination of the presence of the text data in at least the portion of the subtitle text data.

In a fourth aspect, there is provided an apparatus comprising: means for receiving a request for synchronization of subtitle text data with multimedia content; means for accessing summarization data associated with at least a portion of the multimedia content, the summarization data comprising text data generated from at least the portion of the multimedia content; means for comparing the text data with at least a portion of the subtitle text data for determining presence of the text data in the subtitle text data; and means for synchronizing the subtitle text data with the multimedia content based on the determination of the presence of the text data in at least the portion of the subtitle text data.

In a fifth aspect, there is provided a computer program comprising program instructions which when executed by an apparatus, cause the apparatus to: receive a request for synchronization of subtitle text data with multimedia content; access summarization data associated with at least a portion of the multimedia content, the summarization data comprising text data generated from at least the portion of the multimedia content; compare the text data with at least a portion of the subtitle text data for determining presence of the text data in the subtitle text data; and synchronize the subtitle text data with the multimedia content based on the determination of the presence of the text data in at least the portion of the subtitle text data.

BRIEF DESCRIPTION OF THE FIGURES

Various embodiments are illustrated by way of example, and not by way of limitation, in the figures of the accompanying drawings in which:

FIG. 5 is a flowchart depicting an example method for synchronization of subtitle text data in multimedia content in accordance with another example embodiment.

DETAILED DESCRIPTION

Example embodiments and their potential effects are understood by referring to FIGS. 1 through 6 of the drawings.

Figure 1:
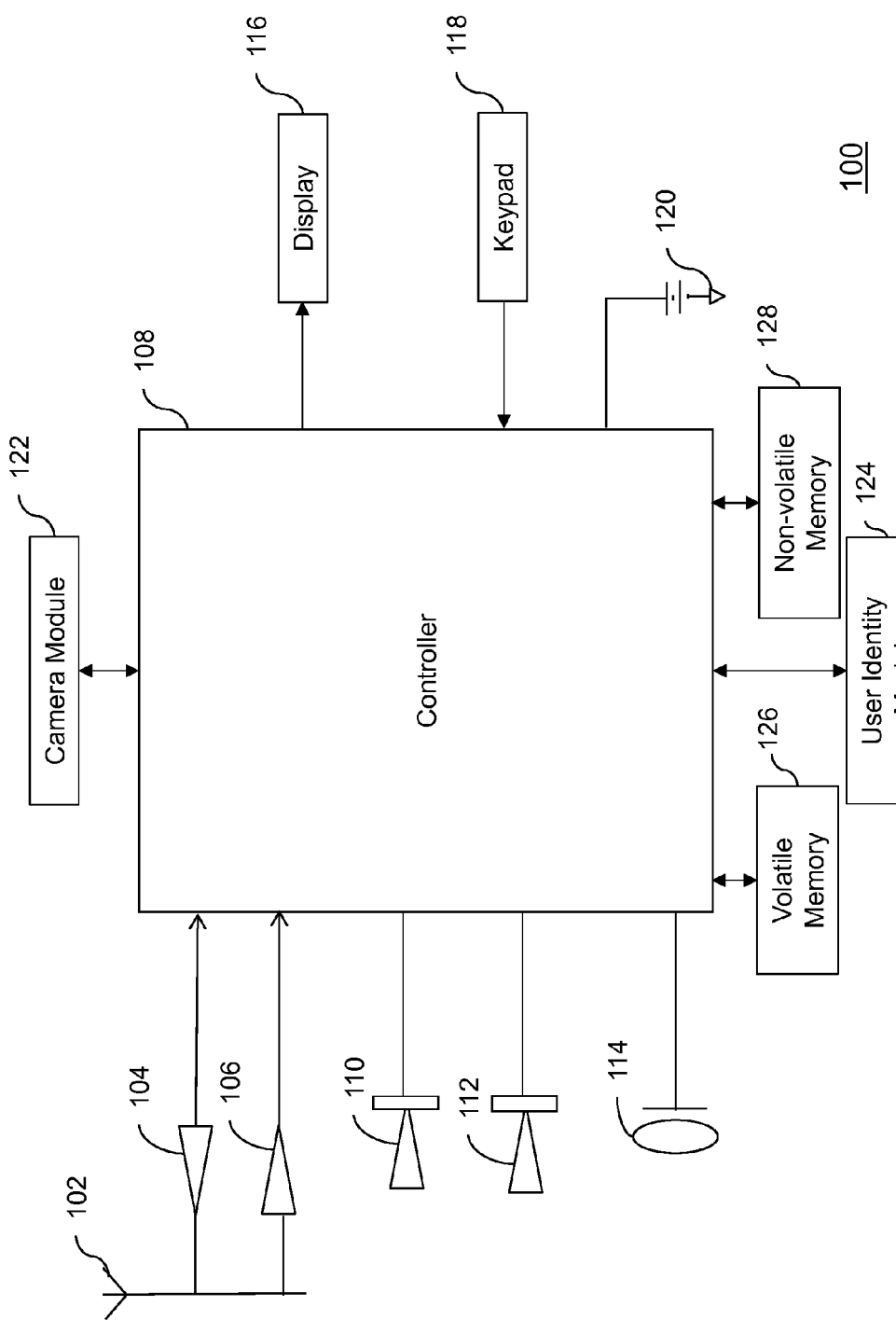
FIG. 1 illustrates a device in accordance with an example embodiment.

FIG. 1 illustrates a device 100 in accordance with an example embodiment. It should be understood, however, that the device 100 as illustrated and hereinafter described is merely illustrative of one type of device that may benefit from various embodiments, therefore, should not be taken to limit the scope of the embodiments. As such, it should be appreciated that at least some of the components described below in connection with the device 100 may be optional and thus in an example embodiment may include more, less or different components than those described in connection with the example embodiment of FIG. 1. The device 100 could be any of a number of types of mobile electronic devices, for example, portable digital assistants (PDAs), pagers, mobile televisions, gaming devices, cellular phones, all types of computers (for example, laptops, mobile computers or desktops), cameras, audio/video players, radios, global positioning system (GPS) devices, media players, mobile digital assistants, or any combination of the aforementioned, and other types of communications devices.

The device 100 may include an antenna 102 (or multiple antennas) in operable communication with a transmitter 104 and a receiver 106. The device 100 may further include an apparatus, such as a controller 108 or other processing device that provides signals to and receives signals from the transmitter 104 and receiver 106, respectively. The signals may include signaling information in accordance with the air interface standard of the applicable cellular system, and/or may also include data corresponding to user speech, received data and/or user generated data. In this regard, the device 100 may be capable of operating with one or more air interface standards, communication protocols, modulation types, and access types. By way of illustration, the device 100 may be capable of operating in accordance with any of a number of first, second, third and/or fourth-generation communication protocols or the like. For example, the device 100 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA1000, wideband CDMA (WCDMA) and time division-synchronous CDMA (TD-SCDMA), with 3.9G wireless communication protocol such as evolved-universal terrestrial radio access network (E-UTRAN), with fourth-generation (4G) wireless communication protocols, or the like. As an alternative (or additionally), the device 100 may be capable of operating in accordance with non-cellular communication mechanisms. For example, computer networks such as the Internet, local area network, wide area networks, and the like; short range wireless communication networks such as include Bluetooth® networks, Zigbee® networks, Institute of Electric and Electronic Engineers (IEEE) 802.11x networks, and the like; wireline telecommunication networks such as public switched telephone network (PSTN).

The controller 108 may include circuitry implementing, among others, audio and logic functions of the device 100. For example, the controller 108 may include, but are not limited to, one or more digital signal processor devices, one or more microprocessor devices, one or more processor(s) with accompanying digital signal processor(s), one or more processor(s) without accompanying digital signal processor(s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits. Control and signal processing functions of the device 100 are allocated between these devices according to their respective capabilities. The controller 108 thus may also include the functionality to convolutionally encode and interleave message and data prior to modulation and transmission.

The controller 108 may additionally include an internal voice coder, and may include an internal data modem. Further, the controller 108 may include functionality to operate one or more software programs, which may be stored in a memory. For example, the controller 108 may be capable of operating a connectivity program, such as a conventional Web browser. The connectivity program may then allow the device 100 to transmit and receive Web content, such as location-based content and/or other web page content, according to a Wireless Application Protocol (WAP), Hypertext Transfer Protocol (HTTP) and/or the like. In an example embodiment, the controller 108 may be embodied as a multi-core processor such as a dual or quad core processor. However, any number of processors may be included in the controller 108.

The device 100 may also comprise a user interface including an output device such as a ringer 110, an earphone or speaker 112, a microphone 114, a display 116, and a user input interface, which may be coupled to the controller 108. The user input interface, which allows the device 100 to receive data, may include any of a number of devices allowing the device 100 to receive data, such as a keypad 118, a touch display, a microphone or other input device. In embodiments including the keypad 118, the keypad 118 may include numeric (0-9) and related keys (#, *), and other hard and soft keys used for operating the device 100. Alternatively or additionally, the keypad 118 may include a conventional QWERTY keypad arrangement. The keypad 118 may also include various soft keys with associated functions. In addition, or alternatively, the device 100 may include an interface device such as a joystick or other user input interface. The device 100 further includes a battery 120, such as a vibrating battery pack, for powering various circuits that are used to operate the device 100, as well as optionally providing mechanical vibration as a detectable output.

In an example embodiment, the device 100 includes a media capturing element, such as a camera, video and/or audio module, in communication with the controller 108. The media capturing element may be any means for capturing an image, video and/or audio for storage, display or transmission. In an example embodiment in which the media capturing element is a camera module 122, the camera module 122 may include a digital camera capable of forming a digital image file from a captured image. As such, the camera module 122 includes all hardware, such as a lens or other optical component(s), and software for creating a digital image file from a captured image. Alternatively, the camera module 122 may include the hardware needed to view an image, while a memory device of the device 100 stores instructions for execution by the controller 108 in the form of software to create a digital image file from a captured image. In an example embodiment, the camera module 122 may further include a processing element such as a co-processor, which assists the controller 108 in processing image data and an encoder and/or decoder for compressing and/or decompressing image data. The encoder and/or decoder may encode and/or decode according to a JPEG standard format or another like format. For video, the encoder and/or decoder may employ any of a plurality of standard formats such as, for example, standards associated with H.261, H.262/MPEG-2, H.263, H.264, H.264/MPEG-4, MPEG-4, and the like. In some cases, the camera module 122 may provide live image data to the display 116. Moreover, in an example embodiment, the display 116 may be located on one side of the device 100 and the camera module 122 may include a lens positioned on the opposite side of the device 100 with respect to the display 116 to enable the camera module 122 to capture images on one side of the device 100 and present a view of such images to the user positioned on the other side of the device 100.

The device 100 may further include a user identity module (UIM) 124. The UIM 124 may be a memory device having a processor built in. The UIM 124 may include, for example, a subscriber identity module (SIM), a universal integrated circuit card (UICC), a universal subscriber identity module (USIM), a removable user identity module (R-UIM), or any other smart card. The UIM 124 typically stores information elements related to a mobile subscriber. In addition to the UIM 124, the device 100 may be equipped with memory. For example, the device 100 may include volatile memory 126, such as volatile random access memory (RAM) including a cache area for the temporary storage of data. The device 100 may also include other non-volatile memory 128, which may be embedded and/or may be removable. The non-volatile memory 128 may additionally or alternatively comprise an electrically erasable programmable read only memory (EEPROM), flash memory, hard drive, or the like. The memories may store any number of pieces of information, and data, used by the device 100 to implement the functions of the device 100.

Figure 2:
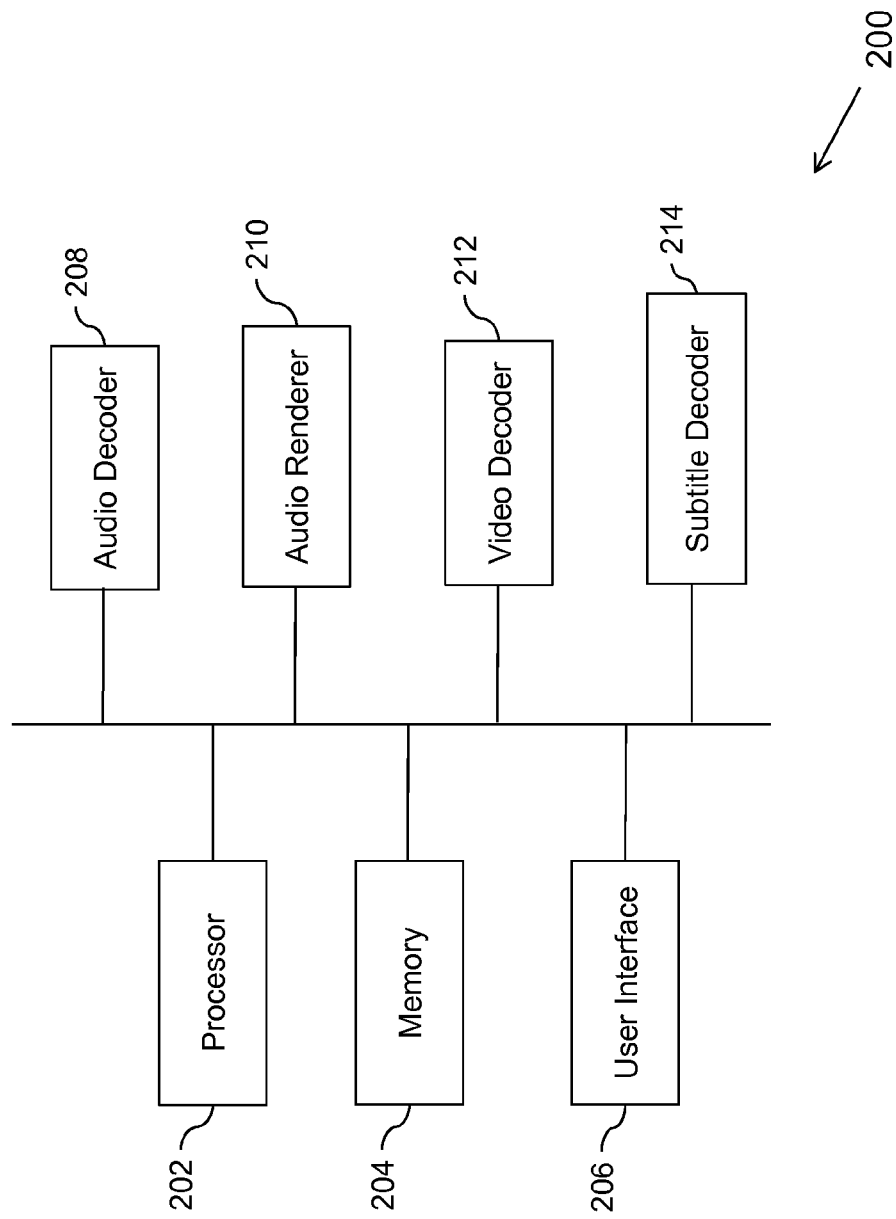
FIG. 2 illustrates an apparatus for subtitle synchronization in multimedia content in accordance with an example embodiment.

FIG. 2 illustrates an apparatus 200 for synchronization of subtitle text data in multimedia content, in accordance with an example embodiment. Examples of the multimedia content may include a video presentation of a television program, a movie, and the like. The multimedia content may include audio content and the video content such that the audio content is in synchronization with the video content. For example, the multimedia content may be a movie scene of a performance depicting a speech by the actor. The actor may speak dialogues in one or more languages. In an embodiment, the dialogues spoken by the actor may be presented to a user accessing (e.g. watching the video) the multimedia content in a textual form, by means of subtitle text data.

The apparatus 200 may be employed for subtitle synchronization in multimedia content, for example, in the device 100 of FIG. 1. However, it should be noted that the apparatus 200, may also be employed on a variety of other devices both mobile and fixed, and therefore, embodiments should not be limited to application on devices such as the device 100 of FIG. 1. Alternatively, embodiments may be employed on a combination of devices including, for example, those listed above. Accordingly, various embodiments may be embodied wholly at a single device, (for example, the device 100 or in a combination of devices. Furthermore, it should be noted that the devices or elements described below may not be mandatory and thus some may be omitted in certain embodiments.

The apparatus 200 includes or otherwise is in communication with at least one processor 202 and at least one memory 204. Examples of the at least one memory 204 include, but are not limited to, volatile and/or non-volatile memories. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the apparatus 200 to carry out various functions in accordance with various example embodiments. For example, the memory 204 may be configured to buffer input data comprising media content for processing by the processor 202. Additionally or alternatively, the memory 204 may be configured to store instructions for execution by the processor 202.

An example of the processor 202 may include the controller 108. The processor 202 may be embodied in a number of different ways. The processor 202 may be embodied as a multi-core processor, a single core processor; or combination of multi-core processors and single core processors. For example, the processor 202 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 204 or otherwise accessible to the processor 202. Alternatively or additionally, the processor 202 may be configured to execute hard coded functionality. As such, whether configured by hardware or software methods, or by a combination thereof, the processor 202 may represent an entity, for example, physically embodied in circuitry, capable of performing operations according to various embodiments while configured accordingly. For example, if the processor 202 is embodied as two or more of an ASIC, FPGA or the like, the processor 202 may be specifically configured hardware for conducting the operations described herein. Alternatively, as another example, if the processor 202 is embodied as an executor of software instructions, the instructions may specifically configure the processor 202 to perform the algorithms and/or operations described herein when the instructions are executed. However, in some cases, the processor 202 may be a processor of a specific device, for example, a mobile terminal or network device adapted for employing embodiments by further configuration of the processor 202 by instructions for performing the algorithms and/or operations described herein. The processor 202 may include, among other things, a clock, an arithmetic logic unit (ALU) and logic gates configured to support operation of the processor 202.

A user interface 206 may be in communication with the processor 202. Examples of the user interface 206 include, but are not limited to, input interface and/or output user interface. The input interface is configured to receive an indication of a user input. The output user interface provides an audible, visual, mechanical or other output and/or feedback to the user. Examples of the input interface may include, but are not limited to, a keyboard, a mouse, a joystick, a keypad, a touch screen, soft keys, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 206 may include, among other devices or elements, any or all of a speaker, a microphone, a display, and a keyboard, touch screen, or the like. In this regard, for example, the processor 202 may comprise user interface circuitry configured to control at least some functions of one or more elements of the user interface 206, such as, for example, a speaker, ringer, microphone, display, and/or the like. The processor 202 and/or user interface circuitry comprising the processor 202 may be configured to control one or more functions of one or more elements of the user interface 206 through computer program instructions, for example, software and/or firmware, stored on a memory, for example, the at least one memory 204, and/or the like, accessible to the processor 202.

In an example embodiment, the apparatus 200 may include an electronic device. Some examples of the electronic device include communication device, media capturing device with communication capabilities, computing devices, and the like. Some examples of the communication device may include a mobile phone, a personal digital assistant (PDA), and the like. Some examples of computing device may include a laptop, a personal computer, and the like. In an example embodiment, the communication device may include a user interface, for example, the UI 206, having user interface circuitry and user interface software configured to facilitate a user to control at least one function of the communication device through use of a display and further configured to respond to user inputs. In an example embodiment, the communication device may include a display circuitry configured to display at least a portion of the user interface of the communication device. The display and display circuitry may be configured to facilitate the user to control at least one function of the communication device.

In an example embodiment, the processor 202 is configured to, with the content of the memory 204, and optionally with other components described herein, to cause the apparatus 200 to facilitate subtitle synchronization in the multimedia content. The multimedia content may include audio data, video data and subtitle text data. The subtitle text data may be prerecorded and stored along with the audio/video data. The apparatus 100 may receive the multimedia content and the subtitle text data from internal memory such as hard drive, random access memory (RAM) of the apparatus 200, or from external storage medium such as DVD, Compact Disk (CD), flash drive, memory card, or from external storage locations through Internet, Bluetooth®, and the like. The apparatus 100 may also receive the multimedia content and the subtitle text data from the memory 204.

In an example embodiment, the processor 202 may be embodied as, include, or otherwise control, an audio decoder 208. The audio decoder 208 may be any means such as a device or circuitry operating in accordance with software or otherwise embodied in hardware or a combination of hardware and software. For example, the processor 202 operating under software control, the processor 202 embodied as an ASIC or FPGA specifically configured to perform the operations described herein, or a combination thereof, thereby configures the apparatus or circuitry to perform the corresponding functions of the audio decoder 208. The audio decoder 208 receives audio data from the multimedia content, and decodes the audio data in a format that may be rendered by an audio renderer 210. In an example embodiment, the processor 202 may be embodied as, include, or otherwise control, the audio renderer 210. The audio renderer 210 may be any means such as a device or circuitry operating in accordance with software or otherwise embodied in hardware or a combination of hardware and software which can render the audio output of the multimedia content. In an example embodiment, the audio renderer 210 may be the example of the ear phone and/or the speaker 112 of the device 100 in combination with accompanying drivers, software, firmware and/or hardware.

In an example embodiment, the processor 202 may be embodied as, include, or otherwise control, a video decoder 212. The video decoder 212 may be any means such as a device or circuitry operating in accordance with software or otherwise embodied in hardware or a combination of hardware and software. For example, the processor 202 operating under software control, the processor 202 embodied as an ASIC or FPGA specifically configured to perform the operations described herein, or a combination thereof, thereby configures the apparatus or circuitry to perform the corresponding functions of the video decoder 212. The video decoder 212 receives video data from of the multimedia content and decodes the video data in a format that can be rendered at the display. In an example embodiment, the video decoder 212 may convert the video data in a plurality of standard formats such as, for example, standards associated with H.261, H.262/MPEG-2, H.263, H.264, H.264/MPEG-4, MPEG-4, and the like.

In an example embodiment, the processor 202 may be embodied as, include, or otherwise control, a subtitle decoder 214. The subtitle decoder 214 may be any means such as a device or circuitry operating in accordance with software or otherwise embodied in hardware or a combination of hardware and software. For example, the processor 202 operating under software control, the processor 202 embodied as an ASIC or FPGA specifically configured to perform the operations described herein, or a combination thereof, thereby configures the apparatus or circuitry to perform the corresponding functions of the subtitle decoder 214. The subtitle decoder 214 receives and decodes a subtitle text data associated with the multimedia content in a format that can be rendered at the display. For example, the subtitle data may be in a format such as MPEG-4 Part 17, MicroDVD, universal subtitle format (USF), synchronized multimedia integration language (SMIL), SubStation Alpha (SSA), continuous media markup language (CMML), SubRip-format (SRT), and the like. In an example embodiment, the subtitle decoder 214 may convert these file formats into a format that can be rendered along with the rendering of the associated video data.

In an example embodiment, the processor 202 is configured to, with the content of the memory 204, and optionally with other components described herein, to cause the apparatus 200 to receive a request for synchronization of the subtitle text data with the multimedia content. In an example embodiment, a processing means may be configured to receive the request for synchronization of the subtitle text data with the multimedia content. An example of the processing means may include the processor 202, which may be an example of the controller 108. In an embodiment, synchronization of the subtitle text data with the multimedia content includes presenting the subtitle text in synchronization with the audio/video content of the multimedia content. An example representation of the presentation of the subtitle text in synchronization with the multimedia content is explained in conjunction with FIG. 3.

In an example embodiment, the subtitle text data may be synchronized with the audio/video data of the multimedia content based on a summarization data associated with at least a portion of the multimedia content. The 'summarization data' may be generated during the summarization of the multimedia content. The term 'summarization' of the multimedia content may refer to a process of representing a plurality of portions of the multimedia content by means of highlights. Example of the plurality of portions of the multimedia content includes plurality of segments, scenes or video shots associated with the multimedia content. The highlights acts as representative of the multimedia content corresponding to a single scene or the entire multimedia media content. Example of the highlights may include thumbnails, images, and the like, extracted from the multimedia content. In an example embodiment, the highlights may be provided to the user for the purpose of selection and browsing of the multimedia content in a convenient manner. A user may browse through the highlights, and select highlights corresponding to the scenes or videos of interest. In an example embodiment, the multiple media segments may be of same or different durations.

In an embodiment, the summarization data may include a time stamp and a thumbnail associated with each of the multiple segments or video shots of the multimedia content. The timestamp is indicative of a time of occurrence of the video segment or the video shot in the multimedia content. In an embodiment, the summarization data also includes text data generated from at least the portion of the multimedia content. In an embodiment, the text data is generated by performing conversion of the audio data associated with at least a portion of the multimedia content into text data.

In an embodiment, at least the portion of the multimedia data may include a portion associated with a beginning of a scene or a segment of the multimedia content. In an embodiment, beginning of a scene/segment may be identified and the audio data associated therewith may be converted into text data. In an embodiment, a possibility of a single speaker at the beginning of the scene is high, thereby facilitating an accurate conversion of audio data (comprising the speech of the speaker in the scene) into text data. At any other position in the multimedia content, the chances of multiple speakers in high, thereby increasing the possibility of overlap of speech of multiple speakers and resulting in low accuracy of the converted text content. In an embodiment, the conversion of audio data in to text data includes identifying the speech content and omitting other music/noise content from the multimedia content. In an embodiment, audio based algorithms may be employed for conversion of the audio data in to text data during summarization of the multimedia content.

In an embodiment, the converted text data may be associated with an accuracy index. The accuracy index may be indicative of the accuracy of conversion of the audio data into text data. In an example embodiment, the text data generated by converting audio data at each of a plurality of portions of the multimedia content may be associated with a distinct accuracy index, wherein the accuracy index of each of the text data may be indicative of accuracy of conversion of that text data from the corresponding portion of the audio data. For example, if in a particular scene of a movie, the speech of the actor is not clearly audible, then the accuracy index associated with the scene may be low. In another example, if the speech by an actor is in multiple languages, the accuracy index associated with the scene may tend to be low. It should be understood that the accuracy index may be dependent on various other factors apart from those mentioned herein, and the exemplary scenarios described herein may not be construed as limiting to the present technology.

In an embodiment, the processor 202 is configured to, with the content of the memory 204, and optionally with other components described herein, to cause the apparatus 200 to select at least a portion of the multimedia content based on the accuracy index of the text data associated with at least the portion of the multimedia content. In an embodiment, the processor 202 is configured to, with the content of the memory 204, and optionally with other components described herein, to cause the apparatus 200 to access the summarization data associated with at least the portion of the multimedia content. In an example embodiment, a processing means may be configured to access the summarization data associated with at least the portion of the multimedia content. An example of the processing means may include the processor 202, which may be an example of the controller 108.

In an embodiment, the processor 202 is configured to, with the content of the memory 204, and optionally with other components described herein, to cause the apparatus 200 to compare the text data with at least a portion of the subtitle text data for determining presence of the text data in the subtitle text data. In an embodiment, the text data may be accessed from the summarization data associated with at least the portion of the multimedia content. In an embodiment, comparing the text data with at least a portion of the subtitle text data includes performing a search in at least the portion of the subtitle text data for the text data in a current time frame. In an example embodiment, the current time frame is determined based on the time stamp associated with the text data. The searching of the text data in at least the portion of the subtitle text data in the current time frame is explained in FIG. 4A. In another embodiment, comparing the text data with at least the portion of the subtitle text data includes performing a search in at least the portion of the subtitle text data for the text data in a time frame of a predetermined width. The searching of the text data in at least the portion of the subtitle text data in the time frame of the predetermined width is explained in FIG. 4B.

In an embodiment, the processor 202 is configured to, with the content of the memory 204, and optionally with other components described herein, to cause the apparatus 200 to synchronize the subtitle text data with the multimedia content based on the determination of the presence of the text data in at least the portion of the subtitle text data. In an embodiment, the subtitle text data is synchronized with the multimedia content by offsetting at least the portion of the subtitle text data with a gap between the text data and at least the portion of the subtitle text data. In an embodiment, offsetting may synchronize the rest of the multimedia content, starting from the position of at least the portion of the multimedia content with the corresponding subtitle text, thereby synchronizing the subtitle text of the complete multimedia content with the corresponding audio/video content of multimedia content. In an example embodiment, a processing means may be configured to synchronize the subtitle text data with the multimedia content based on the determination of the presence of the text data in at least the portion of the subtitle text data. An example of the processing means may include the processor 202, which may be an example of the controller 108.

Figure 3:
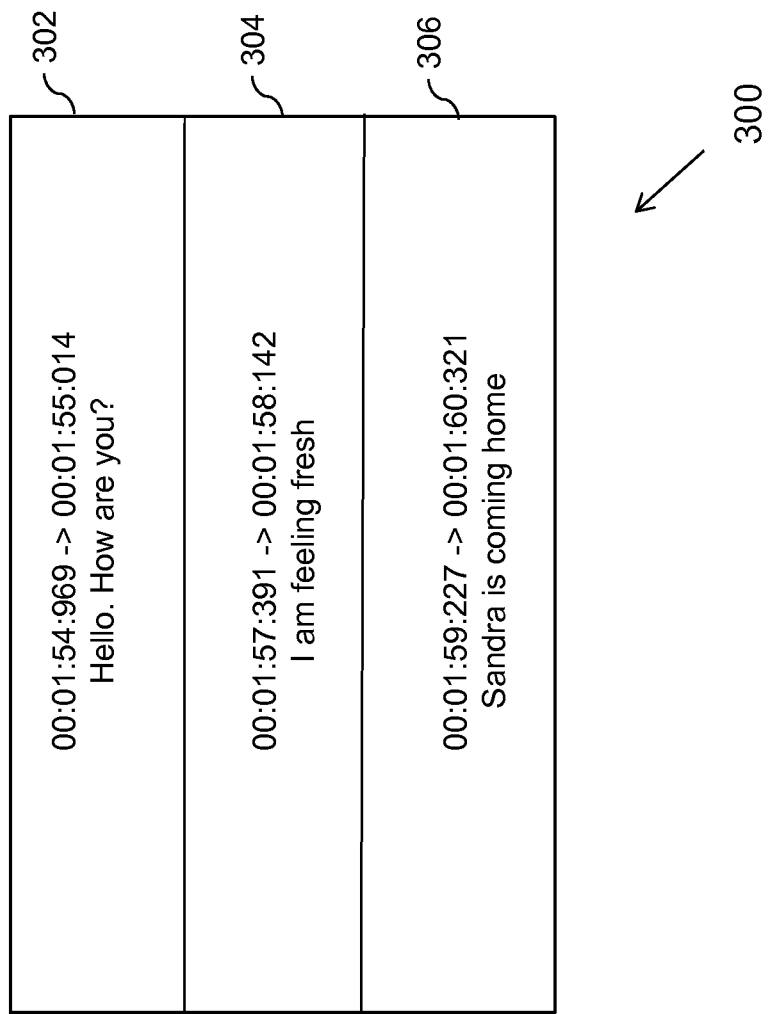
FIG. 3 illustrates an example of subtitle text data for a portion of the multimedia content in accordance with an example embodiment.

FIG. 3 illustrates an example of subtitle text data for a portion of a multimedia content, in accordance with an example embodiment. In an embodiment, the subtitle text data may be prerecorded subtitle text data associated with the audio data or dialogues in the portion of the multimedia content. In another embodiment, the subtitle text data may be composed separately by a content provider other than a provider of the multimedia content. For example, the multimedia content may have dialogues in English language, and the content is to be produced in Japanese language in Japan. In such a scenario, an interested party, for example, a broadcaster in Japan may facilitate generation of the subtitle text data in Japanese language, and provide the subtitle text data along with the multimedia content. The subtitle text data 300 comprises timestamps associated with the dialogues and a text data (for example, a set of words) representing the dialogue. The timestamps facilitates in synchronization of the text of the subtitle data with corresponding video frames in the multimedia content. For example, the text data may be overlaid onto the corresponding video frames depending upon the timestamp.

In an embodiment, the subtitle text data for at least a portion of the multimedia content may include a single or multiple dialogues. For example, as illustrated in FIG. 3, the subtitle text data 300 for the at least a portion of the multimedia content includes multiple dialogues between timestamps [00:01:54:969] to [00:01:60:321]. The subtitle data 300 comprises a first subtitle data 302 to be presented between timestamps [00:01:54:969] to [00:01:55:014], a second subtitle data 304 to be presented between the timestamps [00:01:57:391] to [00:01:58:142], a third subtitle data 306 is to be presented between the timestamps of [00:01:59:227] to [00:01:60:321], and like. In the present embodiment, the timestamps are shown in an example format of [hours:minutes:seconds:milliseconds] from a reference time so that the text of the subtitle data 300 may be synchronized with the corresponding video frames. It will be understood that the format of the reference time may be different from the above described format, and the format may not be construed as limiting to the present technology. For example, there may be other formats of the timestamp, such as, [hours:minutes:milliseconds], [hours:minutes:seconds], and the like. In an example embodiment, the reference time may be [00:00:00:0000]. For example, the reference time may be a starting time of a first frame of the video frames. In another example embodiment, the reference time may be a starting time of the video after an event, for example, intermission during a movie. It should be understood that the reference time may be preprogrammed in the device or may be adjusted based on a user requirement. The selection of the reference time should not be construed as limiting to the present technology.

In an example embodiment, the subtitle text data may be displayed on a display of a multimedia playing device. The multimedia playing device may be an example of a device such as the device 100 (explained with reference to FIG. 1). In the present embodiment, at least the portion of the multimedia content includes a portion of multimedia content occurring at the beginning of a new scene or a new segment. It will be understood that in some embodiments, at least the portion of the multimedia content may include a plurality of portions of the multimedia content occurring at the beginning of a corresponding plurality of new scenes or segments. In an embodiment, for the synchronization of the subtitle data 300 with the multimedia content, the text data (generated by conversion of the audio data) associated with at least the portion of the multimedia content may be accessed and compared with at least the portion of the subtitle text data, for example the subtitle text data 302. Timelines indicating the audio data, the video data and the subtitle text data associated with at least the portion of the multimedia content are explained with reference to FIGS. 4A and 4B.

Figure 4A:
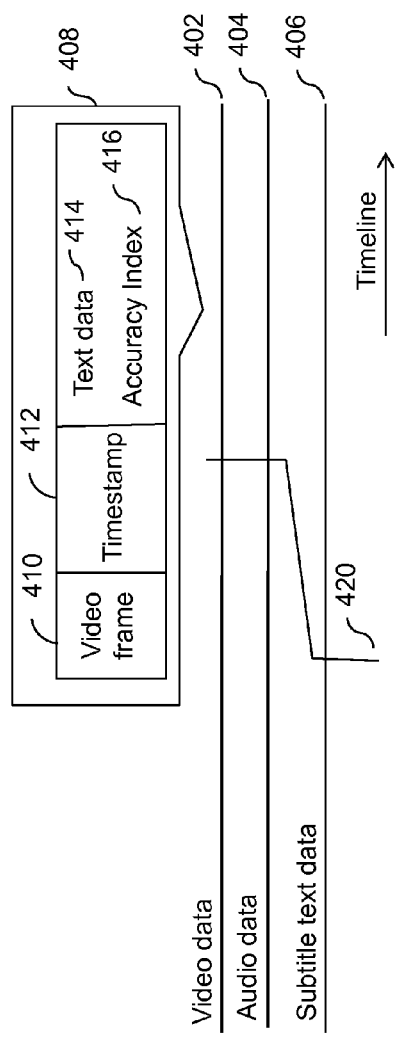
FIGS. 4A and 4B illustrate schematic representations of timeline for synchronization of subtitle text data associated with a portion of multimedia content in accordance with various embodiments.

FIG. 4A illustrates a schematic representation of a timeline for synchronization of subtitle text data associated with a portion of multimedia content in accordance with an embodiment. The multimedia content may include video data (represented as video data 402), audio data (represented as audio data 404), and subtitle text data (represented as subtitle text data 406). On request for synchronization of the pre-recorded subtitle text data with multimedia content, a summarization data, for example a summarization data 408 associated with at least a portion of the multimedia content is accessed. In an embodiment, the summarization data 408 associated with the at least a portion of the multimedia content may include a video frame (for example, a video frame 410), a time stamp (for example, a time stamp 412) indicative of position of the at least a portion of the multimedia content, and a text data (for example, text data 414) generated by performing conversion of the audio data 404 into text data. In an embodiment, the summarization data 408 may also include an accuracy index (for example, an accuracy index 416) associated with the text data 414. The accuracy index is an indicative of accuracy of conversion of the audio data into the text data.

As illustrated in FIG. 4A, the summarization data may be accessed for selecting a text data associated with at least the portion of the multimedia content. In an embodiment, the text data is selected based on the accuracy index assigned to the text data. For example, the summarization data may include three segments of text data, each having different an accuracy index of say 0.7, 0.9 and 0.85 respectively, each corresponding to a distinct portion of the multimedia content. In an embodiment, the text data having highest accuracy index, for example, an accuracy index of 0.9 may be selected. The selected text data may be compared with the subtitle text data 406 for determining the presence of the selected text data in the subtitle text data 406. In an embodiment, the selected text data is compared with the subtitle text data starting from the time stamp (marked as 420 in FIG. 4A) where the summarized video frame is located in the timeline. In an embodiment, the selected text data is compared with the subtitle text data associated with a time frame of a variable width. The variable width of the time frame is explained in detail in FIG. 4B.

Figure 4B:
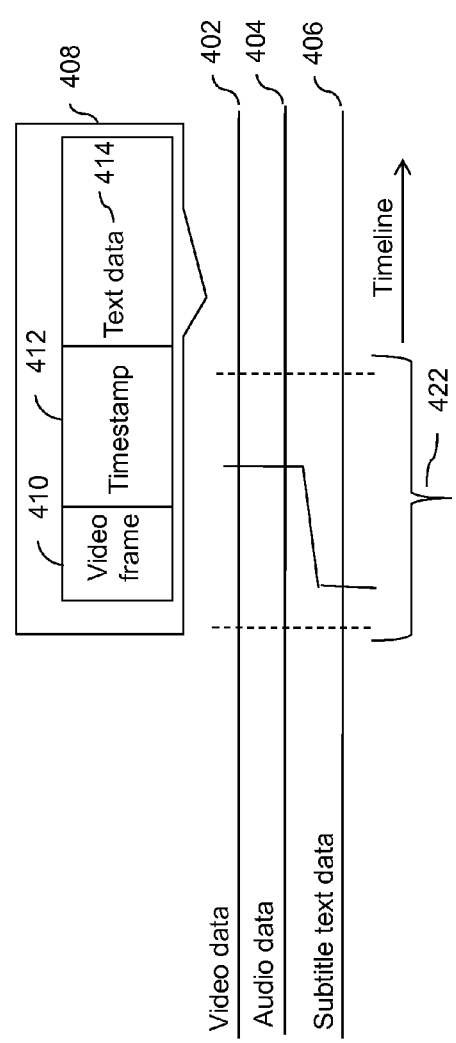

Referring now to FIG. 4B, a schematic representation of a timeline for synchronization of subtitle text data associated with a portion of multimedia content is illustrated in accordance with another embodiment. In one embodiment, the request for synchronization of the subtitle text data with the multimedia may be received when the multimedia content is not summarized. In this embodiment, the multimedia content may be summarized and the audio data associated with at least the portion of the multimedia content is converted into text data. In the present embodiment, the at least a portion of the multimedia content may be a current frame of the multimedia content. The current frame may be a frame corresponding to the portion of the multimedia content that is being played when the request for synchronization of the subtitle text data with the multimedia content is received. The text data may be compared with the subtitle text data. In an embodiment, the comparison of the text data with the subtitle text data is performed within a time frame having a variable width. For example, the comparison may be performed in a time frame of width marked as 422 in FIG. 4B. When, as a result of comparison, the text data is determined to be absent from the subtitle text data in the time frame of the width 422, the width of the time frame may be expanded, and the comparison of the text data may be performed with the portion of the subtitle text data associated with the time frame of expanded width. The present embodiment is illustrated in FIG. 4B. In an embodiment, the width of the time frame may be determined based on a current time stamp. For example, the width of the time frame may include a few seconds or milliseconds before and a few seconds or milliseconds after the current time, as determined by the time stamp. In an example embodiment, the width of the time frame is marked as 422 in FIG. 4B. In another embodiment, the width of the time frame may be expanded to an entire width of the multimedia content, or a multimedia file comprising the multimedia content. For example, during a scenario when the offset of the subtitle text data with the subtitle text data is large or comparable to a substantial portion of the multimedia content, the width of the time frame may be expanded to the entire width of the multimedia content.

FIG. 5 is a flowchart depicting an example method for synchronization of the subtitle text data in multimedia content, in accordance with an example embodiment. The method depicted in flow chart may be executed by, for example, the apparatus 200 of FIG. 2.

At block 502, a request for synchronization of subtitle text data with multimedia content is received. In an embodiment, the request for synchronization may be generated at least in parts and under some circumstances automatically in a device, for example, a multimedia playing device. In another embodiment, the request for synchronization may be received from a user accessing a multimedia playing device. In an embodiment, the synchronization of subtitle text data with multimedia content may be performed by utilizing summarization data associated with the multimedia content. In an embodiment, the multimedia content may include the summarization data. In another embodiment, the multimedia content may not include the summarization data, and may be summarized to generate the summarization data upon receiving the request for synchronization. For example, while accessing the multimedia content, the user may generate a request for synchronization of the multimedia content with the subtitle text data. In response to the request, the multimedia content may be summarized to generate the summarization data.

At block 504, the summarization data associated with at least the portion of the multimedia content is accessed. In an embodiment, the summarization data includes a text data generated from at least the portion of the multimedia content. In an embodiment, the summarization data may also include timestamp information and at least one video thumbnail associated with the multimedia content. The time stamp information may include information regarding position of at least the portion of the multimedia content. In an embodiment, the summarization data may also include an accuracy index associated with the text data. The accuracy index may be indicative of accuracy of conversion of the audio data associated with the multimedia data into the text data. In an embodiment, at least the portion of the multimedia content is selected from the multimedia content prior to accessing the summarization data associated with at least the portion of the multimedia content. In an embodiment, the text data is selected based on the accuracy index assigned to the text data.

In another embodiment, the summarization data associated with the multimedia content may not include the accuracy index. In the present embodiment, the audio data associated with the portions of the multimedia content may be converted to text data, and an accuracy index may be assigned to the text data of the summarized portions of the multimedia content based on the accuracy of the conversion. The summarization data is explained with reference to FIGS. 4A and 4B. In an embodiment, a text data associated with at least the portion of the multimedia content may be selected. In an embodiment, the text data associated with a highest accuracy index.

At block 506, the selected text data may be compared with at least a portion of the subtitle text data for determining presence of the text data in the subtitle text data. In another embodiment, the text data may be generated by converting a portion of the multimedia content, when the request for synchronization of the subtitle text is generated. For example, during a playback of the multimedia content, a user may request for synchronization of the subtitle text data with the audio/video of the multimedia content. On receiving the request, the audio data associated with a currently playing multimedia content may be converted to text data, and the text data may be compared with at least a portion of the subtitle text data.

At block 508, the subtitle text data is synchronized with the multimedia content based on the determination of the presence of the text data in at least the portion of the subtitle text data. In an embodiment, at least the portion of the subtitle text data is offset with at least the portion of the multimedia content for synchronizing the subtitle text data with the multimedia content.

Figure 6:
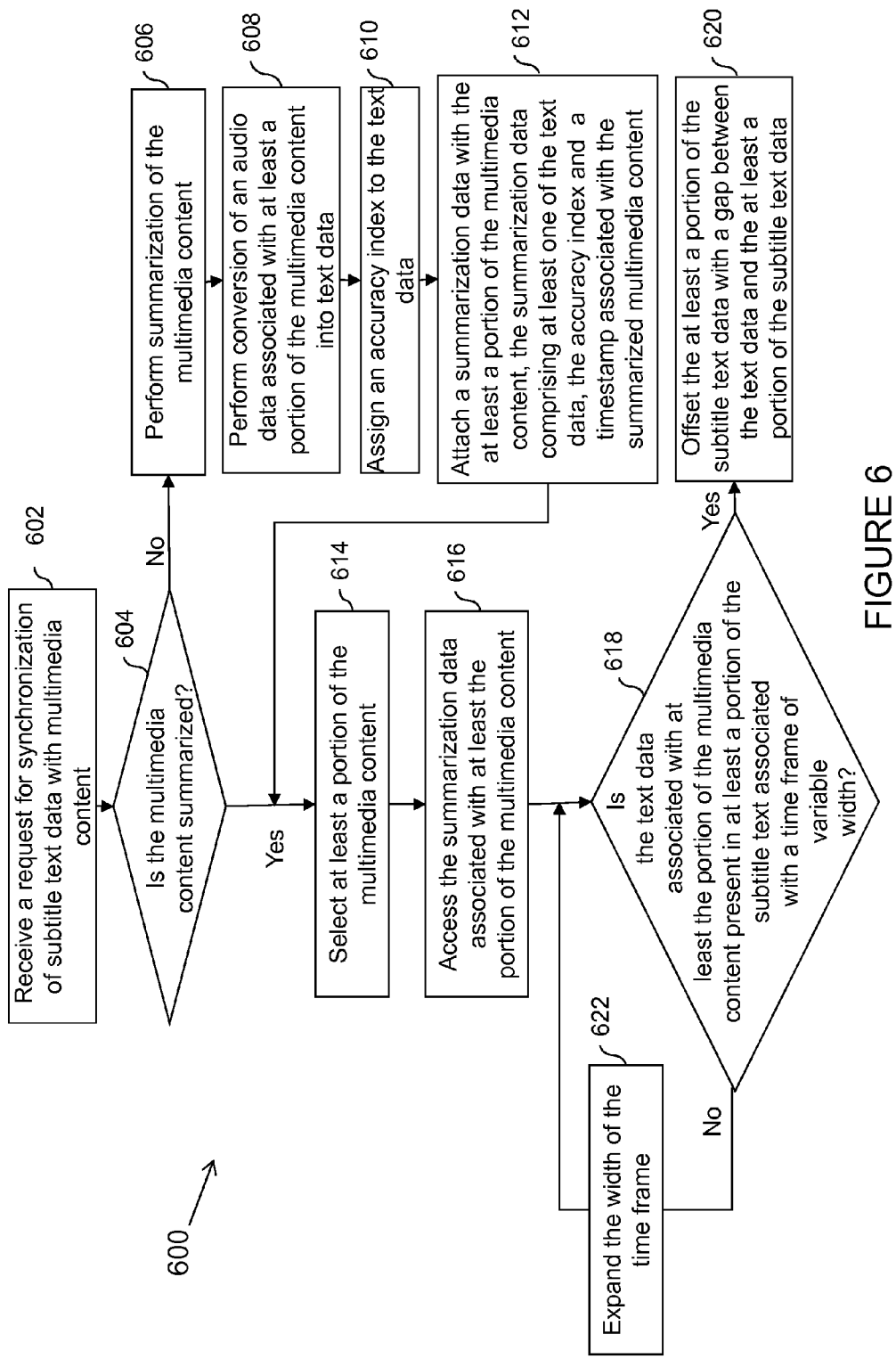
FIG. 6 is a flowchart depicting an example method for synchronization of subtitle text data in multimedia content in accordance with another example embodiment.

FIG. 6 is a flowchart depicting an example method 600 for synchronization of subtitle text data with multimedia content, in accordance with another example embodiment. The method 600 depicted in flow chart may be executed by, for example, the apparatus 200 of FIG. 2. Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowchart. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the operations specified in the flowchart. The computer program instructions may also be loaded onto a computer or other programmable apparatus to cause a series of operations to be performed on the computer or other programmable apparatus to produce a computer-implemented process such that the instructions, which execute on the computer or other programmable apparatus provide operations for implementing the operations in the flowchart. The operations of the method 600 are described with help of apparatus 200. However, the operations of the method can be described and/or practiced by using any other apparatus.

Examples of the multimedia content may include a video presentation of a television program, a movie, and the like. The multimedia content may include audio data and the video content such that the audio data is in synchronization with the video content. For example, the multimedia content may be a movie scene of a performance by an actor, wherein the performance may include speech by the actor. The actor may speak dialogues in one or more languages. In an embodiment, the dialogues spoken by the actor may be presented to a user accessing the multimedia content (e.g. watching the video) by means of subtitles.

In an embodiment, the subtitles may be presented to the user in form of text appearing on a display of the multimedia device. In an example, the text associated with the multimedia content is recorded and stored in a recording medium, such as a memory 204 of the device 200, and presented to the user during the playback of the multimedia content. The recorded text of the subtitles associated with the multimedia content may hereinafter be referred to as subtitle text data. In an embodiment, the subtitle text may be recorded in a file, for example, a subtitle text file.

The subtitle text file may include, apart from the subtitles, a timestamp associated with the respective subtitles. The timestamp may be indicative of position of the respective subtitle in the media content. For example, as explained in FIG. 3, the first subtitle "Hello. How are you?" may be recorded and stored in the subtitle file with a timestamp [00:01:54:969] to [00:01:55:014] attached to the subtitle text, so that upon playing the multimedia content, the subtitle "Hello. How are you?" may appear during the time frame of [00:01:54:969] to [00:01:55:014] on the display of the device.

In an embodiment, when the subtitle text is not displayed in synchronization with the audio and/or video content of the multimedia content, a synchronization may be performed for synchronizing the subtitle text with the audio and/or video content. At block 602, a request for synchronization of the subtitle text with the multimedia content may be received. In an embodiment, the request for synchronization may be generated at least in parts and under some circumstances automatically. For example, at the beginning of the display of the multimedia content, the device may prompt the synchronization of the subtitle text with the audio data. In another embodiment, at the beginning or anytime during the playback of the multimedia content, the user may request for the synchronization of the subtitle text with the multimedia content. For example, the user may initiate a request by means of settings and/or menu pane of a UI of the device for synchronization of the subtitle text with the audio and/or video content.

In an embodiment, the synchronization of the subtitle text with the multimedia content may be performed by utilizing a summarization data associated with the multimedia content. At block 604, it is determined whether or not the multimedia content is summarized. If it is determined at block 604 that the multimedia content is not summarized, then the multimedia content is summarized at block 606. The summarization of multimedia content may include dividing the multimedia content into a plurality of portion or segments, and attaching a thumbnail representative of contents of the portion to the respective segment. Each of the summarized portion of the multimedia content may also include a timestamp indicative of the position and/or occurrence of the potion in the multimedia content. For example, a first portion of the multimedia content may include an action scene. The summarized portion of said scene may include a thumbnail displaying the actor in the action scene, and a timestamp of occurrence of the scene in the multimedia content.

At block 608, a conversion of an audio data associated with at least a portion of the multimedia content into text data is performed. In an embodiment, at least the portion of the multimedia content may be associated with a new scene or a segment of the multimedia content. In an embodiment, the at least a portion of the audio data includes portion of the multimedia content occurring at the beginning of the audio data. In an example embodiment, the portion of the multimedia content appearing at the beginning of a new scene is considered for audio to text conversion since the probability of a single speaker at the beginning of any scene is higher. At any other location of the media content, for example, in the middle of the scene, the chances of multiple speakers in high. Existence of multiple speakers at a location in the multimedia content results in increase in the possibility of overlap of speech of multiple speakers, thereby resulting in low accuracy of the converted text content.

In an embodiment, the conversion of audio data into text data includes identifying the speech content and omitting other music/noise content from the multimedia content. In an embodiment, audio based algorithms may be employed for conversion of the audio data in to text data. In an embodiment, the converted text data may be associated with an accuracy index. At block 610, the accuracy index may be assigned to the text data. The accuracy index may be indicative of the accuracy of conversion of the audio data into text data. For example, in a particular scene if the speech of the speaker is not clearly audible, the accuracy index associated with the scene may be lower. In another example where the audio data includes speech may be in multiple languages, the accuracy index associated with the scene may be to be lower. It should be understood that the accuracy index may be dependent on various other factors apart from those mentioned herein, and the exemplary scenarios described in the above examples may not be construed as limiting to the present technology. In an example embodiment, the multimedia data may be encoded with dedicated channels of speech, thereby facilitating a simpler conversion of the audio data in to text data.

At block 612, a summarization data may be attached along with the at least a portion of the multimedia content. In an embodiment, the summarization data includes at least one of the text data, the accuracy index and the timestamp associated with the summarized multimedia content. For example, with reference to FIGS. 4A and 4B, the summarization data 408 is shown to include the video frame 410, the time stamp 412 indicative of position of the at least a portion of the multimedia content, and the text data 414 generated by performing conversion of the audio data 404 into text data. In an embodiment (shown in FIG. 4A), the summarization data 408 may also include accuracy index 416 associated with the text data 414.

In an embodiment, the multimedia content may include the summarized multimedia content. For example, the multimedia content may already be summarized prior to generation of the request for summarization of the multimedia content. If it is determined at block 604 that the multimedia content is summarized, then at least a portion of the multimedia content is selected at block 614. In an embodiment, the at least a portion of the multimedia content is selected based on an accuracy index assigned to the text data associated with at least one portion. In an example embodiment, a scene having a better quality of audio to text conversion may have a higher accuracy index as compared to a scene having a poor or medium quality of audio to text conversion. In an embodiment, the text data associated with a scene having a higher accuracy index may be selected since the higher accuracy index may facilitate in achieving better and faster subtitle synchronization.

At block 616, the summarization data associated with the at least a portion of the multimedia content is accessed. In an embodiment, the summarization data includes the text data generated by conversion of the audio data associated with the at least a portion of the multimedia content. At block 618, it is determined whether the text data associated with the at least a portion of the multimedia content is present in at least a portion of the subtitle text data. The at least a portion of the text data may be associated with a time frame of variable width. For example, for a text data associated with [00:01:57:391] to [00:01:58:142] timestamp, time frame of predetermined width may include five seconds before the timestamp [00:01:57:391] and five seconds after the timestamp [00:01:58:142]. In another example, the time frame of width may start from the starting time of the [00:01:57:391] timestamp associated with the text data. Various other embodiments and/or examples for determining the width of the time frame may be possible, and the examples mentioned here should not be construed as limiting to the present disclosure.

In an embodiment, the subtitle text data may be compared with all the text data of the subtitle text data beginning from the time frame where the key frame is located in the multimedia content. If the presence of the text data in the subtitle text data is determined within the time frame at block 618, then at least the portion of the subtitle text data is synchronized with the at least a portion of the multimedia content. In an embodiment, the timelines associated with the audio data and the subtitle are adjusted in synchronization by offsetting the at least a portion of the subtitle text data with at least the portion of the multimedia content at block 620.

If however, at block 618 it is determined that the selected text is not present in the at least a portion of the subtitle text within the time frame, then in an embodiment, the width of the time frame is modified. In an embodiment, the predetermined width of the time frame may be expanded. In another embodiment, the time frame of the predetermined width may be shifted so that the selected text data may be compared with a different portion of the subtitle text data associated with a different time frame of the same width. In an embodiment, the process of comparing the selected text data with the different portions of the subtitle text data and/or modifying the width of the time frame may be repeated until a match for the selected text data is found in the subtitle text data.

In an example embodiment, a processing means may be configured to perform some or all of: receiving a request for synchronization of a subtitle text data with multimedia content; accessing summarization data associated with at least a portion of the multimedia content, the summarization data comprising text data generated from at least the portion of the multimedia content; comparing the text data with at least a portion of the subtitle text data for determining presence of the text data in the subtitle text data; and synchronizing the subtitle text data with the multimedia content based on the determination of the presence of the text data in at least the portion of the subtitle text data.

It will be understood that although the method 600 of FIG. 6 shows a particular order, the order need not be limited to the order shown, and more or fewer blocks may be executed, without providing substantial change to the scope of the present disclosure.

Without in any way limiting the scope, interpretation, or application of the claims appearing below, a technical effect of one or more of the example embodiments disclosed herein is to facilitate synchronization of subtitles in multimedia content. The summarization data generated during the summarization of the multimedia content is utilized in synchronizing the subtitles with the multimedia content. Since, the method utilizes already summarized multimedia content, a faster synchronization is leveraged. Various embodiments described herein facilitate conversion of an audio data associated with certain portions (such as beginning of new scenes) of the multimedia content into text data. The presence of the text data in subtitle text data enables in synchronizing the subtitles with the multimedia content. The methods described herein are based on audio data, thereby facilitates better synchronization.

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIGS. 1 and/or 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present disclosure as defined in the appended claims.

We claim:
1. A method comprising:
receiving a request for synchronization of subtitle text data with multimedia content;
accessing summarization data associated with at least a portion of the multimedia content, the summarization data comprising text data generated from at least the portion of the multimedia content;
comparing the text data with at least a portion of the subtitle text data for determining presence of the text data in the subtitle text data; and
synchronizing the subtitle text data with the multimedia content based on the determination of the presence of the text data in at least the portion of the subtitle text data,
wherein the text data is generated by converting audio data associated with at least the portion of the multimedia content into the text data, and further comprising
determining an accuracy index associated with the text data, the accuracy index indicative of an accuracy of the conversion of the audio data into the text data,
where the determined accuracy index comprises a part of the summarization data in conjunction with the text data that is associated with at least the portion of the multimedia content; and
selecting at least the portion of the multimedia content from the multimedia content based on the accuracy index of the text data associated with at least the portion of the multimedia content.

2. The method as claimed in claim 1, wherein at least the portion of the multimedia content comprises a beginning of a scene of the multimedia content.

3. The method as claimed in claim 1, wherein comparing the text data with at least the portion of the subtitle text data comprises performing a search in at least the portion of the subtitle text data for the text data in a current time frame, the current time frame being determined based on a time stamp associated with the text data.

4. The method as claimed in claim 1, wherein comparing the text data with at least the portion of the subtitle text data comprises performing a search in at least the portion of the subtitle text data for determining a presence of the text data during a time frame.

5. The method as claimed in claim 4, wherein the time frame is associated with a variable width, and wherein the variable width of the time frame is expanded if the text data is determined to be absent in at least the portion of the subtitle text data.

6. The method as claimed in claim 1, wherein synchronizing the subtitle text data with the multimedia content comprises offsetting at least the portion of the subtitle text data with a gap between the text data and at least the portion of the subtitle text data on the determination of the presence of the text data in at least the portion of the subtitle text data.

7. An apparatus comprising:
at least one processor; and
at least one memory comprising computer program code, the at least one memory and the computer program code configured to, with the at least one processor, cause the apparatus to at least perform:
receive a request for synchronization of subtitle text data with multimedia content;
access summarization data associated with at least a portion of the multimedia content, the summarization data comprising text data generated from at least the portion of the multimedia content;
compare the text data with at least a portion of the subtitle text data for determining presence of the text data in the subtitle text data; and
synchronize the subtitle text data with the multimedia content based on the determination of the presence of the text data in at least the portion of the subtitle text data,
wherein the text data is generated by converting audio data associated with at least the portion of the multimedia content into the text data, and wherein the apparatus is further caused, at least in part, to
determine an accuracy index associated with the text data, the accuracy index indicative of an accuracy of the conversion of the audio data into the text data,
where the determined accuracy index comprises a part of the summarization data in conjunction with the text data that is associated with at least the portion of the multimedia content; and
select at least the portion of the multimedia content from the multimedia content based on the accuracy index of the text data associated with at least the portion of the multimedia content.

8. The apparatus as claimed in claim 7, wherein at least the portion of the multimedia content comprises a beginning of a scene of the multimedia content.

9. The apparatus as claimed in claim 7, wherein the apparatus is further caused, at least in part, to compare the text data with at least the portion of the subtitle text data by performing a search in at least the portion of the subtitle text data for the text data in a current time frame, the current time frame being determined based on a time stamp associated with the text data.

10. The apparatus as claimed in claim 7, wherein the apparatus is further caused, at least in part, to compare the text data with at least the portion of the subtitle text data by performing a search in at least the portion of the subtitle text data for determining presence of the text data during a time frame.

11. The apparatus as claimed in claim 10, wherein the time frame is associated with a variable width, and wherein the apparatus is further caused, at least in part, to expand the variable width of the time frame when the text data is determined to be absent in at least the portion of the subtitle text data.

12. The apparatus as claimed in claim 7, wherein the apparatus is further caused, at least in part, to synchronize the subtitle text data with the multimedia content by offsetting at least the portion of the subtitle text data with a gap between the text data and at least the portion of the subtitle text data on the determination of the presence of the text data in at least the portion of the subtitle text data.

13. A computer program product comprising at least one non-transitory computer-readable storage medium, the non-transitory computer-readable storage medium comprising a set of instructions, which, when executed by one or more processors, cause an apparatus at least to perform:
receive a request for synchronization of subtitle text data with multimedia content;
access summarization data associated with at least a portion of the multimedia content, the summarization data comprising text data generated from at least the portion of the multimedia content;
compare the text data with at least a portion of the subtitle text data for determining presence of the text data in the subtitle text data; and
synchronize the subtitle text data with the multimedia content based on the determination of the presence of the text data in at least the portion of the subtitle text data,
wherein the text data is generated by converting audio data associated with at least the portion of the multimedia content into the text data, and wherein the apparatus is further caused, at least in part, to
determine an accuracy index associated with the text data, the accuracy index indicative of an accuracy of the conversion of the audio data into the text data,
where the determined accuracy index comprises a part of the summarization data in conjunction with the text data that is associated with at least the portion of the multimedia content; and
select at least the portion o f the multimedia content from the multimedia content based on the accuracy index of the text data associated with at least the portion of the multimedia content.

14. The computer program product as claimed in claim 13, wherein the apparatus is further caused, at least in part, to perform: compare the text data with at least the portion of the subtitle text data by performing a search in at least the portion of the subtitle text data for the text data in a current time frame, the current time frame being determined based on a time stamp associated with the text data.

15. The computer program product as claimed in claim 13, wherein the apparatus is further caused, at least in part, to perform: compare the text data with at least the portion of the subtitle text data by performing a search in at least the portion of the subtitle text data for determining a presence of the text data during a time frame.

16. The computer program product as claimed in claim 13, wherein the apparatus is further caused, at least in part, to perform: synchronize the subtitle text data with the multimedia content by offsetting at least the portion of the subtitle text data with a gap between the text data and at least the portion of the subtitle text data on the determination of the presence of the text data in at least the portion of the subtitle text data.

* * * * *